United States Patent
Kucherov et al.

(10) Patent No.: US 10,331,350 B1
(45) Date of Patent: *Jun. 25, 2019

(54) CAPACITY DETERMINATION FOR CONTENT-BASED STORAGE

(71) Applicant: EMC IP Holding Company LLC, Hopkinton, MA (US)

(72) Inventors: Anton Kucherov, Milford, MA (US); Ophir Buchman, Newton, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/499,297

(22) Filed: Apr. 27, 2017

(51) Int. Cl.
*G06F 3/06* (2006.01)

(52) U.S. Cl.
CPC .......... *G06F 3/0608* (2013.01); *G06F 3/0644* (2013.01); *G06F 3/0652* (2013.01); *G06F 3/0665* (2013.01); *G06F 3/0688* (2013.01); *G06F 3/0689* (2013.01); *G06F 2201/84* (2013.01)

(58) Field of Classification Search
CPC ........ G06F 3/0641; G06F 17/3015–17/30162; G06T 11/206
See application file for complete search history.

(56) References Cited

U.S. PATENT DOCUMENTS

| | | | |
|---|---|---|---|
| 7,921,086 B1 * | 4/2011 | Bromley | G06F 17/30067 707/692 |
| 2010/0281081 A1 * | 11/2010 | Stager | G06F 9/5022 707/814 |
| 2012/0144149 A1 * | 6/2012 | Aronovich | G06F 11/3485 711/171 |
| 2014/0114933 A1 * | 4/2014 | Chandrasekarasastry | G06F 12/02 707/692 |
| 2014/0136491 A1 * | 5/2014 | Nemoto | G06F 3/0608 707/692 |
| 2014/0351214 A1 * | 11/2014 | Abercrombie | G06F 17/30575 707/626 |
| 2016/0253291 A1 * | 9/2016 | Tzerluk | G06F 17/2247 715/234 |
| 2017/0024142 A1 * | 1/2017 | Watanabe | G06F 3/06 |
| 2017/0308305 A1 * | 10/2017 | Goel | G06F 3/0608 |
| 2018/0074745 A1 * | 3/2018 | Harnik | G06F 3/0641 |

OTHER PUBLICATIONS

Patterson et al. Computer Organization and Design. 2014. Morgan Kaufmann. pp. 16-28.*

(Continued)

*Primary Examiner* — Nathan Sadler
(74) *Attorney, Agent, or Firm* — Daly, Crowley, Mofford & Durkee, LLP

(57) ABSTRACT

A computer program product, system, and method for visiting each node of a snapshot tree within a content-based storage system having a plurality of volumes and/or snapshots; for each node, scanning an address-to-hash (A2H) table to calculate one or more resource usage metrics, wherein the A2H tables map logical I/O addresses to chunk hashes; and determining, based on the resource usage metrics, an amount of memory and/or disk capacity that would be freed by deleting one or more of the volumes and/or snapshots.

20 Claims, 10 Drawing Sheets

(56) References Cited

OTHER PUBLICATIONS

Ben Fry. Visualizing Data. 2008. O'Reilly. pp. 189-219.*
Ben Shneiderman. "Tree Visualization with Tree-Maps: 2-d Space-Filling Approach." Jan. 1992. ACM. ACM Transactions on Graphics. vol. 11. pp. 92-99.*
Shilane et al. "99 Deduplication Problems." Jun. 2016. USENIX. HotStorage '16.*
U.S. Appl. No. 15/499,303, filed Apr. 27, 2017, Kucherov et al.
Office Action dated Jul. 30, 2018 for U.S. Appl. No. 15/499,303; 14 Pages.
Response to U.S. Non-Final Office Action dated Jul. 30, 2018 for U.S. Appl. No. 15/499,303; Response filed on Sep. 19, 2018; 14 Pages.
U.S. Final Office Action dated Oct. 25, 2018 for U.S. Appl. No. 15/499,303; 8 Pages.
Non-Final Office Action dated Feb. 8, 2019 for U.S. Appl. No. 15/499,303; 11 Pages.
RCE and Response to Final Office Action dated Oct. 25, 2018 for U.S. Appl. No. 15/499,303, filed Jan. 3, 2019; 12 Pages.

\* cited by examiner

200

LUN 0

| Address | Hash |
|---|---|
| 0 | abc |
| 1 | def |
| 2 | ghi |
| 3 | abc |
| 5 | jlk |
| 6 | jlk |
| 7 | mno |

| Address | Hash |
|---|---|
| 0 | abc |
| 1 | def |
| 2 | ghi |
| 3 | abc |
| 5 | jlk |
| 6 | jlk |
| 7 | mno |

202a

LUN 0

| Address | Hash |
|---|---|
| 0 | mno |
| 2 | pqr |

202b

LUN 1

| Address | Hash |
|---|---|
| 2 | pqr |
| 4 | stu |
| 7 | stu |

FIG. 2B

CAPACITY DETERMINATION FOR CONTENT-BASED STORAGE

BACKGROUND

Content-based storage (sometimes referred to as content-addressable storage or CAS) stores data based on its content, providing inherent data deduplication and facilitating in-line data compress, among other benefits. Existing content-based storage systems may utilize an array of storage device such as solid-state drives (SSDs, also known as solid-state disks) to provide high performance scale-out storage.

Within a content-based storage system, data may be organized into one or more volumes identified by respective logical unit numbers (LUNs). User applications can read/write data to/from a volume by specifying a LUN and an address (or "offset") relative to the LUN. Some content-based storage systems allow for volumes to be cloned and for the creation of volume snapshots. To reduce system resource usage, internal data structures may be shared across different volumes and/or snapshots.

SUMMARY

It is appreciated herein that it can be challenging to determine system resources (e.g., memory and/or disk capacity) used by individual volumes/snapshots within a content-based storage system. There is a need for new methods of determining volume/snapshot resource usage taking into account deduplication and compression, as well as the internal data structures used to maintain volumes/snapshots. Such information can be presented to a user (e.g., a storage administrator) to allow the user to make decisions about, for example, which volumes/snapshots to delete.

According to one aspect of the disclosure, a method comprises: visiting each node of a snapshot tree within a content-based storage system having a plurality of volumes and/or snapshots; for each node, scanning an address-to-hash (A2H) table to calculate one or more resource usage metrics, wherein the A2H tables map logical I/O addresses to chunk hashes; and determining, based on the resource usage metrics, an amount of memory and/or disk capacity that would be freed by deleting one or more of the volumes and/or snapshots.

In some embodiments, for each node, scanning the A2H table to calculate one or more resource usage metrics includes determining a count of entries in the A2H table. In certain embodiments, determining an amount of memory and/or disk capacity that would be freed by deleting one or more of the volumes and/or snapshots includes determining, for each node, an amount of memory based on the count of entries in the A2H table. In particular embodiments, the method further comprises determining accessible space provided by one or more of the volumes and/or snapshots.

In some embodiments, for each node, scanning the A2H table to calculate one or more resource usage metrics includes: finding one or more unique chunks associated with the node; and determining a compression ratio for each of the unique chunks associated with the node. In certain embodiments, determining an amount of memory and/or disk capacity that would be freed by deleting one or more of the volumes and/or snapshots includes determining, for each node, a minimum disk capacity that would be freed by deleting the node using a count of unique chunks and the compression ratios. In particular embodiments, for each node, scanning the A2H table to calculate one or more resource usage metrics includes: determining a count of chunks associated with the node; determining a compression ratio for each of the chunks associated with the node; and determining a reference count for each of the chunks associated with the node. In some embodiments, determining an amount of memory and/or disk capacity that would be freed by deleting one or more of the volumes and/or snapshots includes determining, for each node, an estimated disk capacity that would be freed by deleting the node based on the count of chunks associated with the node, the compression ratios, and the reference counts.

According to another aspect of the disclosure, a system comprises one or more processors; a volatile memory; and a non-volatile memory storing computer program code that when executed on the processor causes the processor to execute a process operable to perform embodiments of the method described above.

According to yet another aspect of the disclosure, a computer program product tangibly embodied in a non-transitory computer-readable medium, the computer-readable medium storing program instructions that are executable to perform embodiments of the method described hereinabove.

BRIEF DESCRIPTION OF THE DRAWINGS

The foregoing features may be more fully understood from the following description of the drawings in which:

FIGS. 2A and 2B are diagrams of illustrative address-to-hash (A2H) tables that may be used within a content-based storage system, in accordance with embodiments of the disclosure;

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the structures and techniques sought to be protected herein, some terms are explained. As used herein, the term "storage system" may be broadly construed so as to encompass, for example, private or public cloud computing systems for storing data as well as systems for storing data comprising virtual infrastructure and those not comprising virtual infrastructure. As used herein, the terms "client" and "user" may refer to any person, system, or other entity that uses a storage system to read/write data.

As used herein, the terms "disk" and "storage device" may refer to any non-volatile memory (NVM) device, including hard disk drives (HDDs), flash devices (e.g., NAND flash devices), and next generation NVM devices, any of which can be accessed locally and/or remotely (e.g., via a storage attached network (SAN)). The term "storage array" may be used herein to refer to any collection of storage devices. As used herein, the term "memory" may refer to volatile memory used by the storage system, such as dynamic random access memory (DRAM).

As used herein, the terms "I/O read request" and "I/O read" refer to a request to read data. The terms "I/O write request" and "I/O write" refer to a request to write data. The terms "I/O request" and "I/O" refer to a request that may be either an I/O read request or an I/O write request. As used herein the term "logical I/O address" and "I/O address" refers to a logical address used by users/clients to read/write data from/to a storage system.

While vendor-specific terminology may be used herein to facilitate understanding, it is understood that the concepts, techniques, and structures sought to be protected herein are not limited to use with any specific commercial products.

Figure 1:
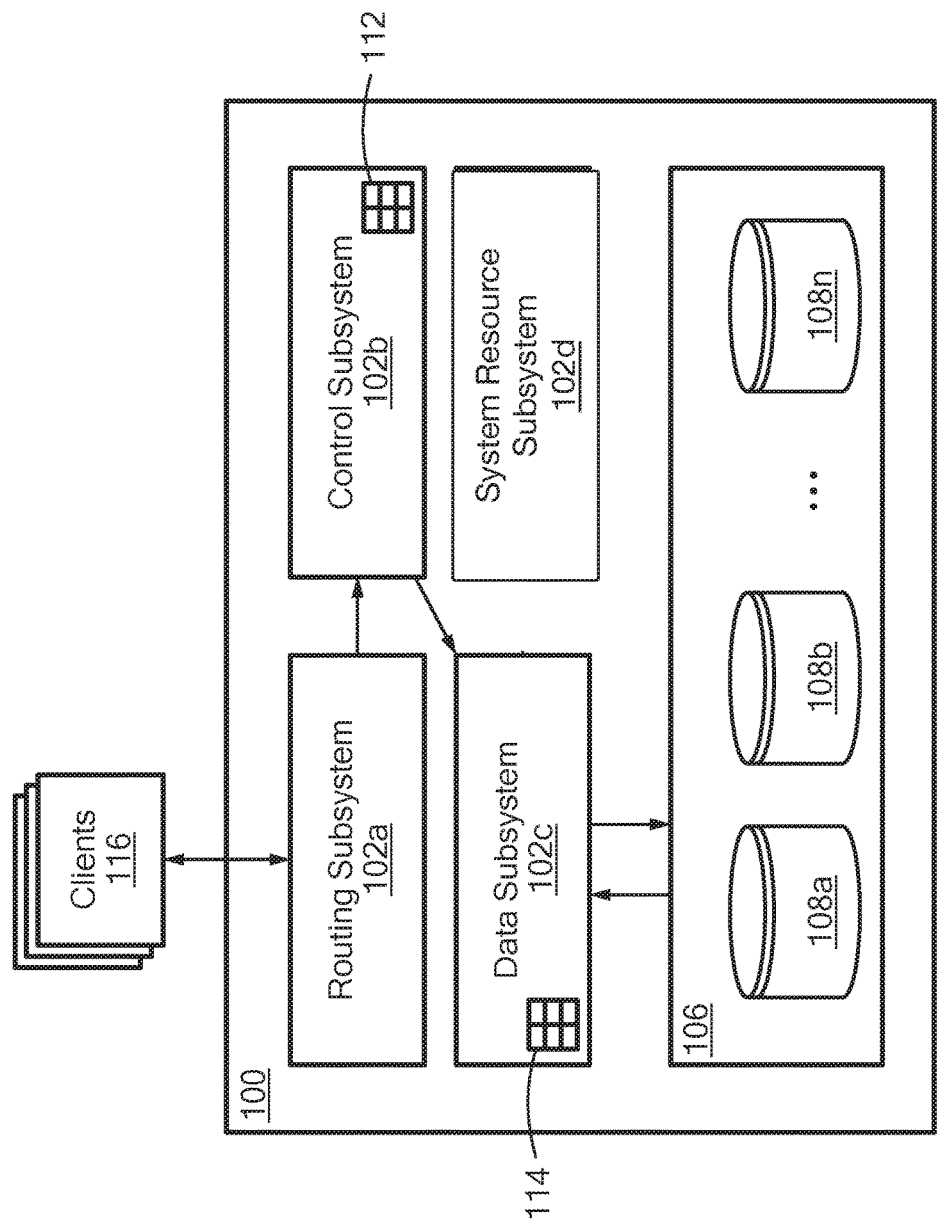
FIG. 1 is a block diagram of a content-based storage system, in accordance with an embodiment of the disclosure.

FIG. 1 shows a storage system 100 according to an illustrative embodiment of the disclosure. The storage system 100 may include a plurality of subsystems (or "processors") 102a-102d (generally denoted 102 herein), and a storage array 106 comprising a plurality of disks 108a . . . 108n (generally denoted 108 herein). In some embodiments, the disks 108 correspond to SSDs. In various embodiments, the storage array 106 is heterogeneous, meaning that the disks 108 may have different storage capacities (or "sizes").

In the embodiment shown, the subsystems 102 include a routing subsystem 102a, a control subsystem 102b, a data subsystem 102c, and a system resource subsystem 102d. In one embodiment, the subsystems 102 may be provided as software modules, i.e., computer program code that, when executed on a processor, may cause a computer to perform functionality described herein. In a certain embodiment, the storage system 100 includes an operating system (OS) and one or more of the subsystems 102 may be provided as user space processes executable by the OS. In other embodiments, a subsystem 102 may be provided, at least in part, as hardware such as digital signal processor (DSP) or an application specific integrated circuit (ASIC) configured to perform functionality described herein.

The routing subsystem 102a may be configured to receive I/O requests from clients 116 and to translate client requests into internal commands. Each I/O request may be associated with a particular volume and may include one or more I/O addresses (i.e., logical addresses within that volume). The storage system 100 stores data in fixed-size chunks, for example 4 KB chunks, where each chunk is uniquely identified within the system using a "hash" value that is derived from the data/content stored within the chunk. The routing subsystem 102a may be configured to convert an I/O request for an arbitrary amount of data into one or more internal I/O requests each for a chunk-sized amount of data. The internal I/O requests may be sent to one or more available control subsystems 102b for processing. In some embodiments, the routing subsystem 102a is configured to receive Small Computer System Interface (SCSI) commands from clients. In certain embodiments, I/O requests may include one or more logical block addresses (LBAs).

For example, if a client 116 sends a request to write 8 KB of data starting at logical address zero (0), the routing subsystem 102a may split the data into two 4 KB chunks, generate a first internal I/O request to write 4 KB of data to logical address zero (0), and generate a second internal I/O request to write 4 KB of data to logical address one (1). The routing subsystem 102a may calculate hash values for each chunk of data to be written, and send the hashes to the control subsystem(s) 102b. In one embodiment, chunk hashes are calculated using a Secure Hash Algorithm 1 (SHA-1).

As another example, if a client 116 sends a request to read 8 KB of data starting at logical address one (1), the routing subsystem 102a may generate a first internal I/O request to read 4 KB of data from address zero (0) and a second internal I/O request to read 4 KB of data to address one (1).

The control subsystem 102b may also be configured to clone storage volumes and to generate snapshots of storage volumes using techniques known in the art. For each volume/snapshot, the control subsystem 102b may maintain a so-called "address-to-hash" (A2H) tables 112 that maps I/O addresses to hash values of the data stored at those logical addresses.

The data subsystem 102c may be configured to maintain one or more so-called "hash-to-physical address" (H2P) tables 114 that map chunk hash values to physical storage addresses (e.g., storage locations within the storage array 106 and/or within individual disks 108). Using the H2P tables 114, the data subsystem 102c handles reading/writing chunk data from/to the storage array 106. The H2P table may also include per-chunk metadata such as a compression ratio and a reference count. A chunk compression ratio indicates the size of the compressed chunk stored on disk compared to the uncompressed chunk size. For example, a compression ratio of 0.25 may indicate that the compressed chunk on disk is 25% smaller compared to its original size. A chunk reference count may indicate the number of times that the chunk's hash appears within A2H tables. For example, if the same chunk data is stored at two different logical addresses with the same volume/snapshots (or within two different volumes/snapshots), the H2P table may indicate that the chunk has a reference count of two (2).

It will be appreciated that combinations of the A2H 112 and H2P 114 tables can provide multiple levels of indirection between the logical (or "I/O") address a client 116 uses to access data and the physical address where that data is stored. Among other advantages, this may give the storage system 100 freedom to move data within the storage array 106 without affecting a client's 116 access to that data (e.g., if a disk 108 fails). In some embodiments, an A2H 112 table and/or an H2P 114 table may be stored in memory.

The system resource subsystem 102d may be configured to determine system resource usage associated with individual volumes/snapshots. In particular embodiments, the system resource subsystem 102d may be configured to perform at least some of the processing described below in conjunction with FIGS. 4 and 4A-4E. In some embodiments, the system resource subsystem 102d may be integrated into the control subsystem 102b.

In some embodiments, storage system 100 corresponds to a node within a distributed storage system having a plurality of nodes, each of which may include one or more of the subsystems 102a-102d.

In some embodiments, the system 100 includes features used in EMC® XTREMIO®.

Referring to FIG. 2A, within a content-based storage system (e.g., storage system 100 of FIG. 1), volumes and/or snapshots may be represented using one or more A2H tables. An A2H table (or simply "table") includes zero or more entries each having an "Address" value and a corresponding "Hash" value. For a given table entry, the Address value corresponds to an I/O address used by a client to read/write a chunk of data, and the Hash value corresponds to a hash value calculated over the chunk data. Thus, for example, within a volume/snapshot represented by illustrative table 200, the chunk stored at I/O address "0" has a hash value of "abc." To promote clarity in the drawings, hash values may be shown as 3-character values (e.g., "abc"). However, it should be understood that hash values may be represented as more than 3 characters and in any suitable format (e.g., 160-bit values in the case of SHA-1).

An A2H table may be associated with a volume number and/or snapshot identifier managed. In the example of FIG. 2A, the A2H table 200 is associated with LUN "0."

Referring to FIG. 2B, within a content-based storage system (e.g., storage system 100 of FIG. 1), a user can generate a new volume or snapshot by "cloning" or "snapping" an existing volume. For example, if a user clones a first volume (e.g., LUN "0"), the storage system (or, in some embodiments, a control subsystem 102b therein) will generate a second volume (e.g., LUN "1") having identical contents to the first volume. Over time, the contents of the two volumes may diverge as I/O writes are performed to one or both volumes. Similarly, a user can generate a snapshot of an existing volume having the identical contents at the time the snapshot is generated.

As illustrated in FIG. 2B, when a user clones or snaps an existing volume associated with an existing A2H table 200, the storage system may generate two new A2H tables 202a, 202b, as shown. The volume number (e.g., LUN "0") that was previously associated with table 200 is reassigned to a first one of the new tables 202a, as shown. Thus, in this example, table 202a is said to "assume the identity" of the volume being cloned/snapped. A new volume number (e.g., LUN "1") or snapshot identifier is assigned to the other new table 202b.

To reduce memory usage, a technique similar to "copy-on-write" (COW) may be used when generating new A2H tables as part of a volume clone/snapshot. In particular, the new A2H tables 202a, 202b may be generated as empty tables that are linked to the existing table 200. In this arrangement, table 200 may be referred to as a "parent table," and tables 202a, 202b may be referred to as "child tables" (generally denoted 202). If an I/O read is received for a volume/snapshot associated with a child table 202, the control subsystem first checks if the child table 202 includes an entry for the I/O address: if so, the control subsystem uses the hash value from the child table 202; otherwise, the control subsystem uses the hash value (if any) from the parent table 200. If an I/O write is received for a volume/snapshot associated with a child table 202, the control subsystem adds or updates an entry in the child table 202, but does not modify the parent table 200. Referring to the example of FIG. 2B, to process an I/O read for address "1" of LUN "0," the storage system may first determine that child table 202a does not include an entry for this address, and then determine that parent table 200 indicates chunk hash "def" for this address.

A logical address that exists in a parent table and not in either of its child tables is referred to herein as a "shared address." For example, in FIG. 2B, address "1" is a shared address of parent table 200. A logical address that exists in a parent table and in one, but not both, of its child tables is referred to herein as a "shadow address." For example, address "7" is a shadow address because it exists in parent table 200 and in child table 202b, but it does not exist in child table 202a. In some embodiments, when calculating storage metrics using A2H tables, shared addresses may be attributed to a parent table, whereas shadow addresses may be attributed to the child table lacking that address rather than to the parent table.

As discussed above in conjunction with FIG. 1, a content-based storage system may provide data deduplication. In particular, multiple chunks having the same hash value may be stored as a single chunk on disk. For example, as shown in FIG. 2B, the data stored at address "2" in volume LUN "0" and the data stored at address "2" in volume LUN "1" may be stored as a single chunk on disk. As also discussed above, chunk data may be compressed on disk (e.g., using in-line compression). Thus, determining the amount of disk/memory capacity used by a given volume/snapshot can be challenging.

Figure 3A:
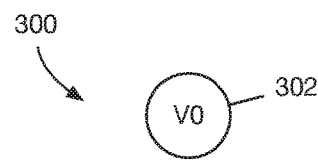
FIGS. 3A-3C are diagrams of illustrative snapshot trees that may be used within a content-based storage system, in accordance with embodiments of the disclosure.
Figure 3B:
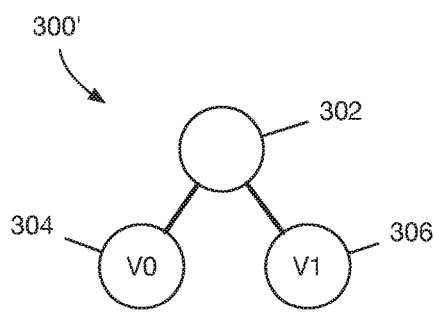
Figure 3C:
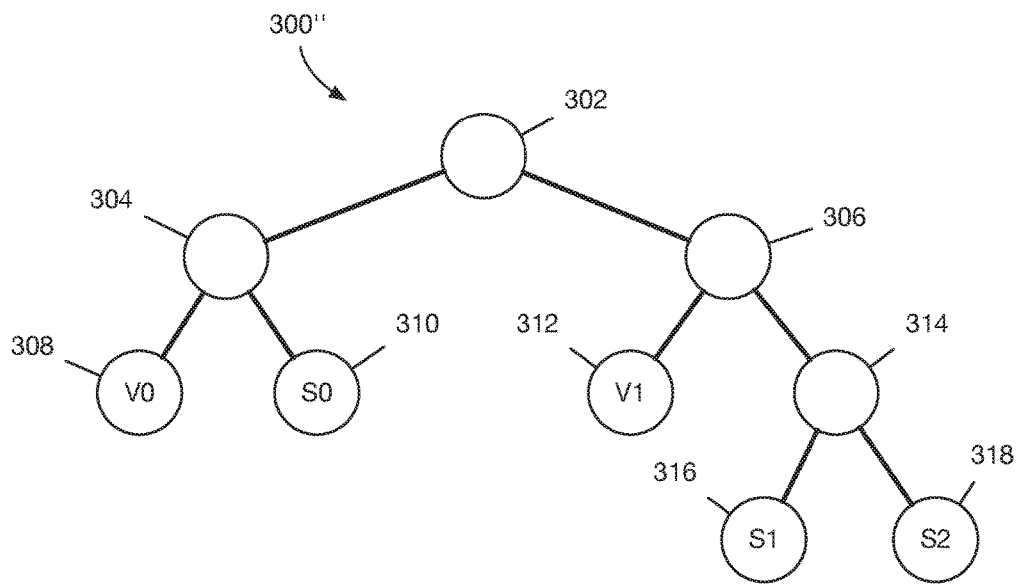

Referring to FIGS. 3A-3C, within a content-based storage system, volumes and snapshots can be organized into tree structures (referred to herein as "snapshot trees") wherein each node is associated with a volume/snapshot and a corresponding A2H table. In the example of FIG. 3A, a volume V0 is associated with root node 302 of snapshot tree 300. In response to a clone/snap operation, two child nodes are added to produce tree 300' (FIG. 3B). A first child node 304 assumes the identity of volume V0, whereas a second child node 306 is associated with a new volume/snapshot V1.

The volumes/snapshots associated with child nodes 304, 306 can likewise be cloned/snapped, resulting in additional nodes being added to the snapshot tree. For example, as shown by tree 300" in FIG. 3C, volume V0 may be again cloned/snapped resulting in new node 308 associated with volume V0 and new node 310 associated with volume/snapshot S0; volume/snapshot V1 may be cloned/snapped resulting in new nodes 312, 314 and that new volume/snapshot may itself be cloned/snapped resulting in new nodes 316, 318 associated with volumes/snapshots S1, S2 respectively. In one example, the V0 may correspond to a production volume, V1 may correspond to a development volume, and S0, S1, S2 may correspond to snapshots (e.g., snapshots made for backup and/or testing purposes).

Within a snapshot tree, each leaf node represents either a volume or a snapshot. In addition to having its own A2H table, each volume/snapshot leaf node inherits the A2H tables of its ancestors, recursively up to the root node. When processing an I/O read for a given volume/snapshot, the control subsystem searches for the first A2H table containing the I/O address, starting from volume/snapshot leaf node and terminating at the root node. Thus, the copy-on-write semantics described above may be extended to an arbitrary number of clones/snapshots.

It is appreciated herein that determining the actual memory and/or disk storage capacity used by an individual volume/snapshot in a content-based storage system may be challenging due to aforementioned copy-on-write table semantics, along with data de-duplication and in-line compression. In particular, there is a need for techniques to determine (or estimate) the amount of memory/disk capacity that would be freed by deleting a particular volume/snapshot from the content-based storage system, taking into account that some (or all) of the chunk content associated with the volume/snapshot may be referenced by other volumes/snapshots. Various techniques for determining/estimating how much memory/disk capacity would be freed by deleting a given volume/snapshot are described below in conjunction with FIGS. 4 and 4A-4E.

FIGS. 4 and 4A-4E are flow diagrams showing illustrative processing that can be implemented within content-based storage systems (such as storage system 100 of FIG. 1). Rectangular elements (typified by element 402 in FIG. 4), herein denoted "processing blocks," represent computer software instructions or groups of instructions. Diamond shaped elements (typified by element 426 in FIG. 4A), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Figure 4:
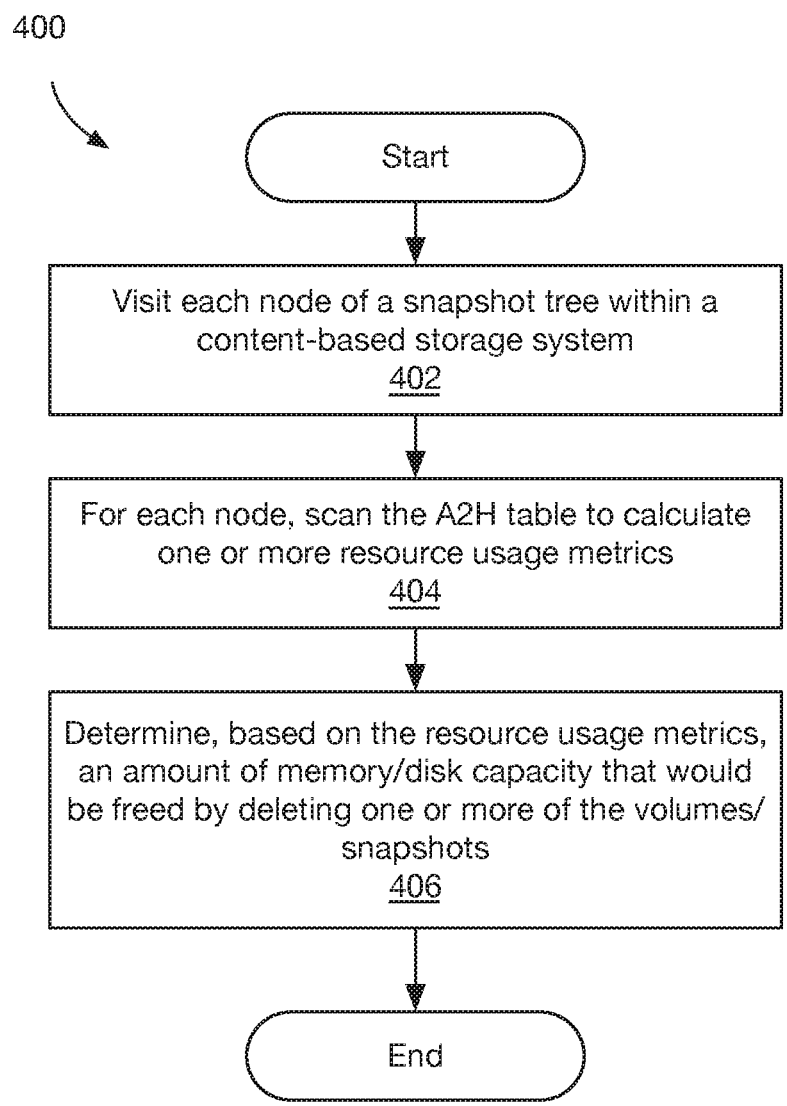
FIGS. 4 and 4A-4E are flow diagrams illustrating processing that may occur within a content-based storage system, in accordance with some embodiments of the disclosure.

Referring to FIG. 4, a method 400 begins at block 402, where each node of a snapshot tree is visited. In some embodiments, visiting each node includes traversing the tree starting from the root node and recursively visiting child nodes. For example, referring to FIG. 3C, the nodes of snapshot tree 300" may be visited in the following order: 302, 304, 308, 310, 306, 312, 314, 316, and 318.

Figure 4A:
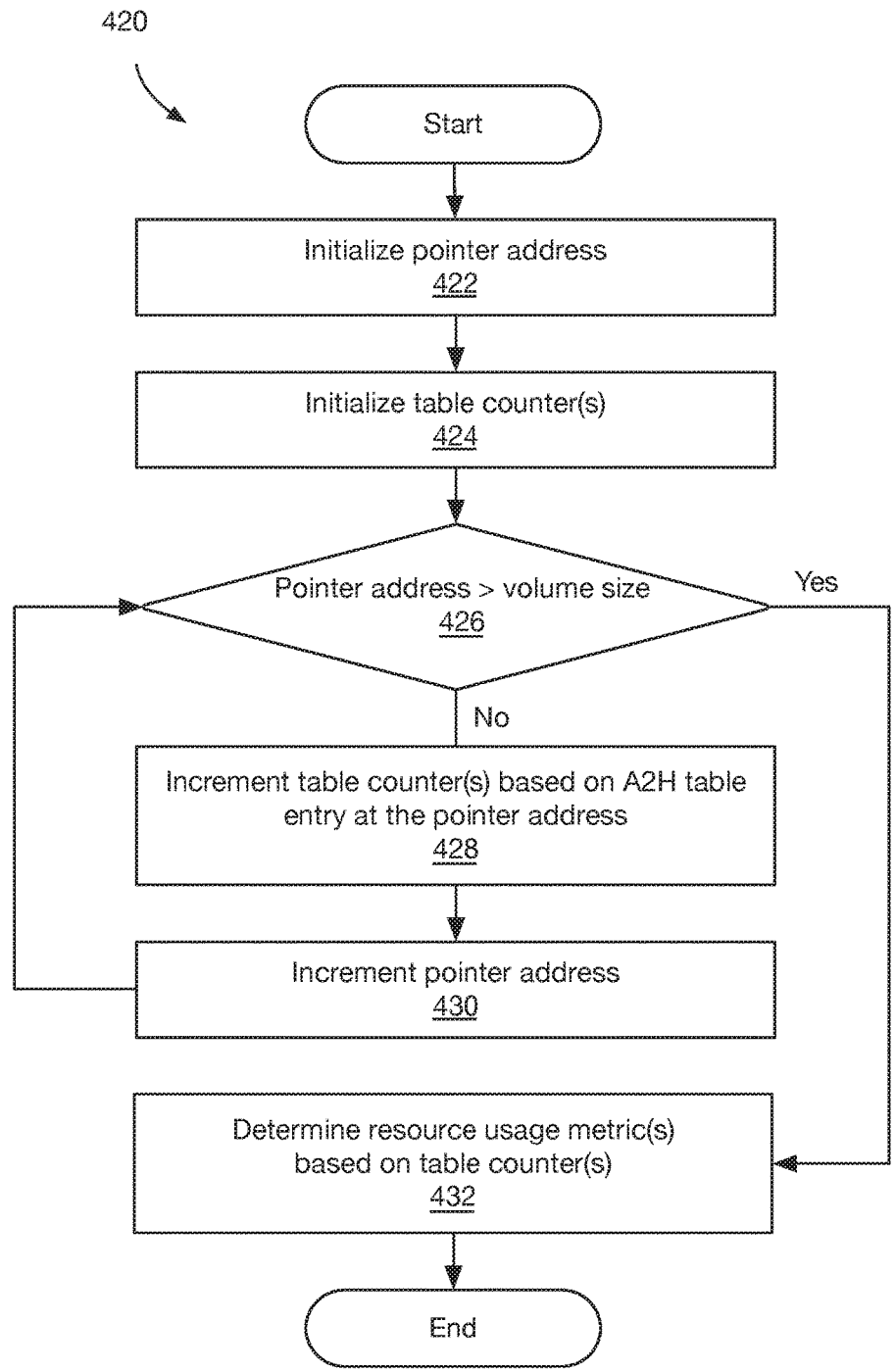

At block 404, for each node of the snapshot tree, an associated A2H table is scanned to calculate one or more resource usage metrics for the node. An illustrative technique for scanning an A2H table is shown in FIG. 4A and described below in conjunction therewith. Examples of resource usage metrics that may be calculated for each node are described below in conjunction with FIGS. 4B-4E.

At block 406, an amount of memory and/or disk capacity that would be freed (or "released") by deleting one or more of the volumes/snapshots is determined based on the per-node resource usage metrics. In various embodiments, determining memory/disk capacity that would be freed by deleting volumes/snapshots includes summing the resource usage metrics for the corresponding leaf nodes, as well as the usage metrics for any ancestor nodes that are not also ancestors of other volumes/snapshots. For example, referring to FIG. 3C, assume that the following memory usage metrics are calculated for tree 300': 50 MB for node 314, 2 MB for node 316 (S1), and 1 MB for node 318 (S2). In this simple example, it may be determined that deleting snapshot S1 by itself would free up 2 MB of memory, deleting snapshot S2 by itself would free up 1 MB of memory, but deleting both S1 and S2 would free up 53 MB of memory because the memory used by node 314 could also be deleted.

In some embodiments, the information determined at block 404 may be presented to a user (e.g., a storage administrator). In other embodiments, the information determined at block 404 may be used to automatically delete volumes/snapshots within the content-based storage system. For example, in the event that memory/disk capacity is exhausted (or nearly exhausted), the storage system may automatically find and delete one or more snapshots that would free up sufficient memory/disk capacity to allow the storage system to continue operating.

Referring to FIG. 4A, a method 420 may be used to calculate one or more resource usage metrics associated with a snapshot tree node by scanning the node's A2H table, according to some embodiments.

At block 422, a pointer address is initialized (e.g., P=0). At block 424, one or more table counters are initialized. The specific table counters used depend on the resource usage metric being calculated. For example, when calculating memory usage for a node, a table counter may include a count of the number of entries in the node's A2H table. Other examples are described below.

Blocks 426-430 represent a loop that is performed over the node's logical address space, e.g., starting at zero (0) and ending at the largest possible address within the nodes A2H table. In many embodiments, all volumes/snapshots within the same snapshot tree may have the same logical volume size and, thus, the largest possible address for any node is based on the logical volume size. In some embodiments, counters for multiple tables (e.g., all A2H tables associated with a snapshot tree) may be incremented within the loop 426-430. At block 432, one or more resource usage metrics are determined based on the table counters.

In certain embodiments, incrementing table counters (block 428) may include taking into account whether an A2H table entry corresponds to a shared address and/or a shadow address. For example, when scanning an A2H table associated with a non-leaf node (e.g., node 304 in FIG. 3C), counters associated with the non-leaf node may be incremented for shared addresses that have changed. However, for shadow addresses that have changed with the non-leaf node's A2H table, counters associated with an descendant node (e.g., node 308 in FIG. 3C) may be incremented instead.

FIGS. 4B-4E show methods that can be used in conjunction with FIG. 4A for calculating various resource usage metrics over a snapshot tree.

Figure 4B:
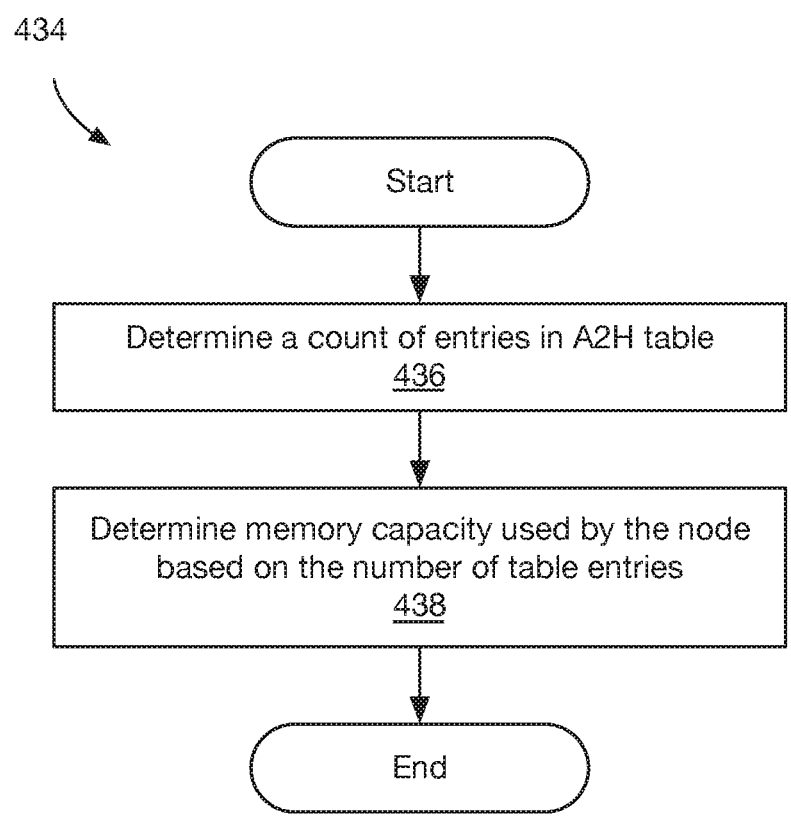

Referring to FIG. 4B, a method 434 may be used to determine a memory capacity used by a snapshot tree node—or, equivalently, the amount of memory that would be freed by deleting the node—according to some embodiments. At block 436, the number of entries in the node's A2H table are counted. At block 438, memory capacity used by the node is determined based on the number of table entries. In some embodiments, each table entry takes up a fixed amount of memory (e.g., N bytes) and, thus, memory capacity can be determined by multiplying the number of table entries by a predetermined constant.

Figure 4C:
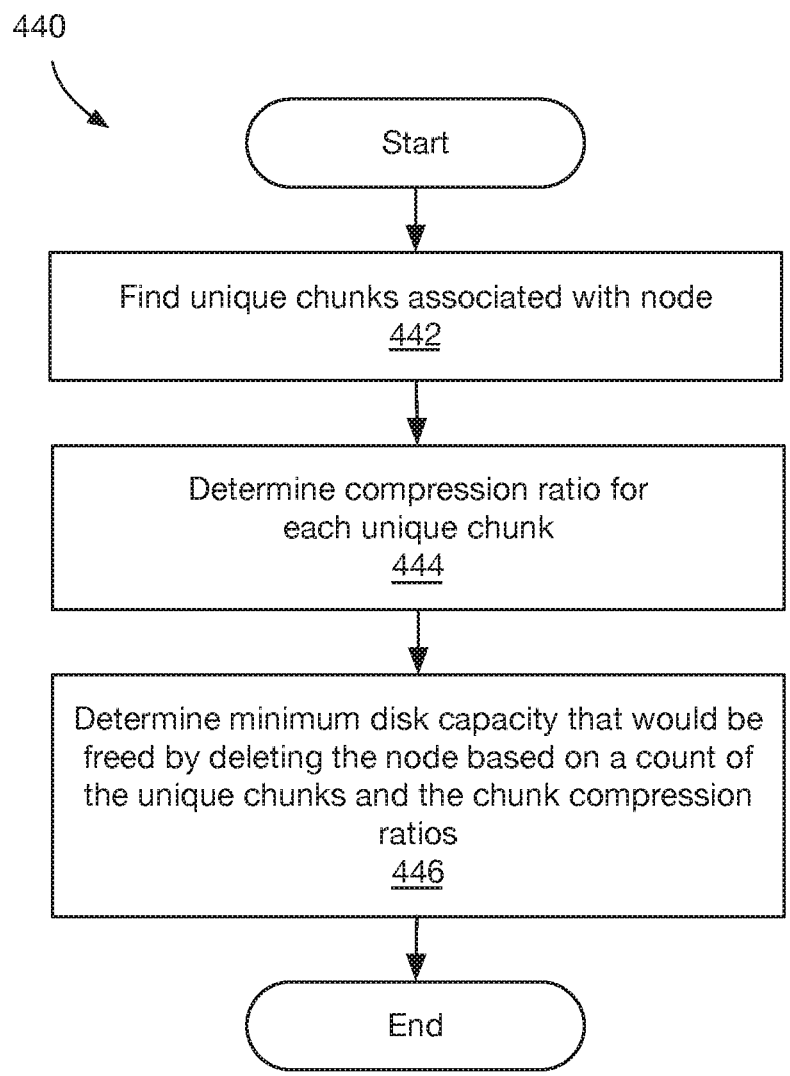

Referring to FIG. 4C, a method 440 may be used to determine a minimum disk capacity that would be freed by deleting a snapshot tree node, according to some embodiments. At block 442, unique chunks associated with the node are identified. As used herein, the term "unique chunk" refers to a chunk that has a reference count equal one (1). As discussed above, a H2P table may include a reference count (in addition to other metadata) for chunks within a content-based storage system. Thus, block 442 may include scanning the node's A2H table and, for each entry therein, using a H2P table to determine if the corresponding chunk has a reference count equal to one (1).

At block 444, a compression ratio is determined for each of the unique chunks, for example, using metadata in the H2P table.

At block 446, a minimum disk capacity ($dc_{min}$) that would be freed by deleting a snapshot tree node may be determined based on the number of unique chunks ($n_{uniq}$) and the corresponding chunk compression ratios ($c_i$). In some embodiments, the minimum disk capacity may be calculated as follows:

$$dc_{min} = \left(n_{uniq} - \sum_{i=1}^{n_{uniq}} c_i\right) \times C$$

where C is the fixed chunk size.

For example, if a node includes n=2 unique chunks having respective compression ratios $c_1$=0.25 and $c_2$=0.4, where each chunk is 8 KB, then the minimum disk capacity that would be freed by deleting the node may be determined as 10.8 KB.

Figure 4D:
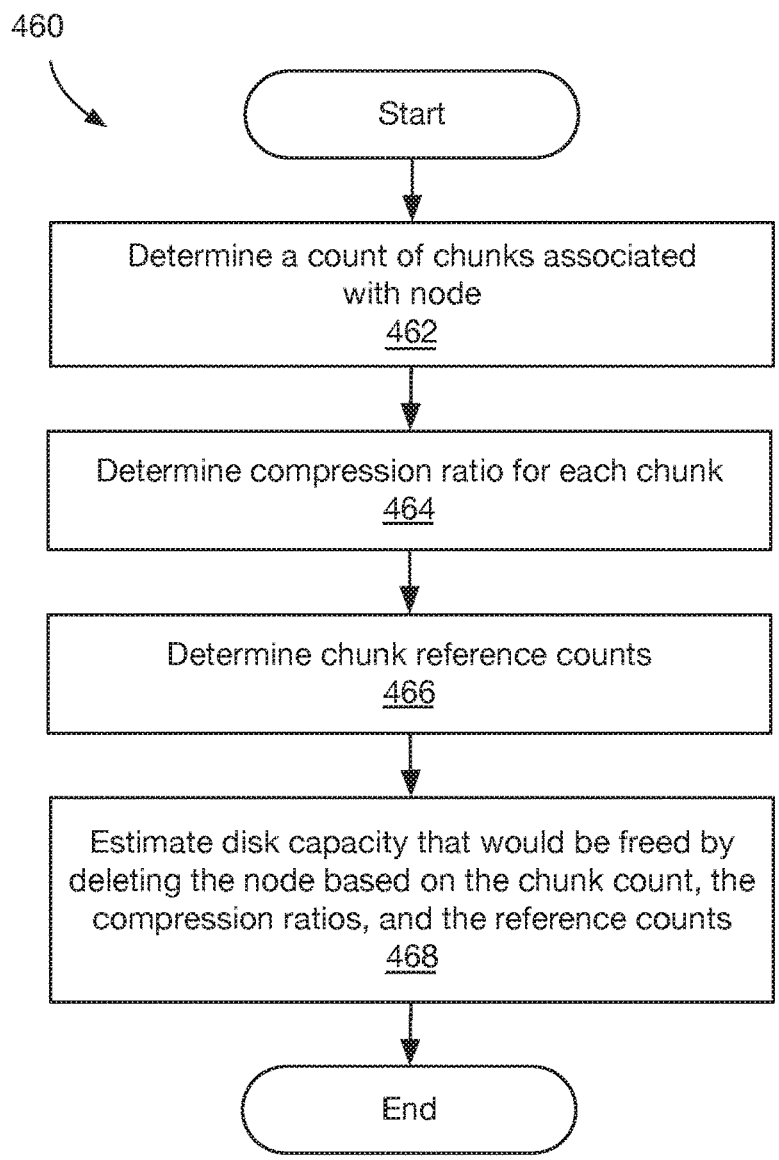

Referring to FIG. 4D, a method 460 may be used to estimate disk capacity that would be freed by deleting a snapshot tree node, according to some embodiments. Whereas the method described in FIG. 4C may be used to determine a minimum guaranteed disk capacity, the method of FIG. 4D provides an estimate of the actual disk capacity that would be freed. It should be understood that each of these metrics may be useful for managing a storage system.

At block 462, a number of chunks associated with the node is determined. In some embodiments, this includes scanning the node's A2H table and counting the total number of entries (including entries that have duplicate hash values). At blocks 464 and 466, a compression ratio and a reference count may be determined for each of the chunks (e.g., using an H2P table).

At block 468, an estimate of disk capacity ($dc_{est}$) that would be freed by deleting the node is calculated based on the total number of chunks ($n_{total}$) associated with the node, the chunk compression factors ($c_i$), and the chunk reference counts ($r_i$). In some embodiments, the estimate may be calculated as follows:

$$dc_{est} = \left(\frac{n_{total} - \sum_{i=1}^{n_{total}} c_i}{\frac{\sum_{i=1}^{n_{total}} r_i}{n_{total}}}\right) \times C$$

where C is the fixed chunk size. In will be appreciated that, in the equation above, the outmost numerator corresponds to a compression-adjust (or "weighted") sum of the chunks and the outermost denominator corresponds to the average number of reference counts per chunk.

Figure 4E:
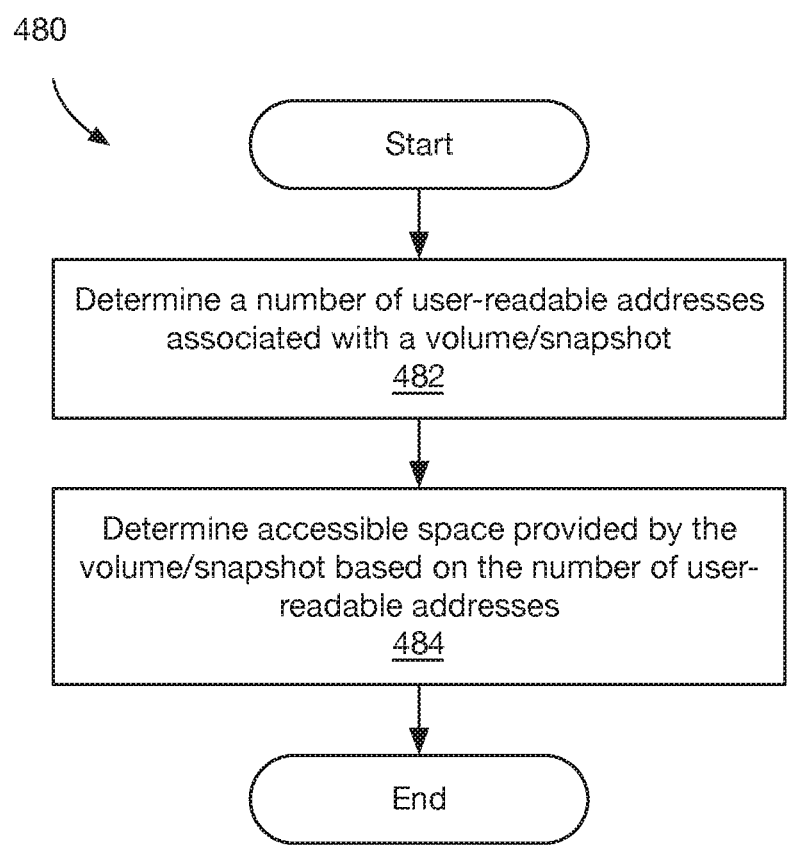

Referring to FIG. 4E, a method 480 may be used to determine accessible space provided by one or more volumes/snapshots, represented as leaf nodes within a snapshot tree. As used herein, the term "accessible space" refers to an amount of storage capacity provided by a volume/snapshot as seen by a user application. In other words, a volume/snapshot's accessible space is a measure of the number of logical addresses that can be read by a client/user application.

At block 482, a number of user-readable addresses associated with a volume/snapshot is determined, for example, by scanning A2H tables associated with a leaf node and its ancestor nodes. In some embodiments, a storage system includes a process to find the differences between two snapshots and this process may be used to determine the number of user-readable addressable (e.g., by comparing the volume/snapshot against an empty snapshot). At block 484, accessible space provided by the volume/snapshot is determined based on the number user-readable addresses. In some embodiments, the accessible space is calculated by multiplying the number of user-readable addresses by a fixed chunk size.

Figure 5:
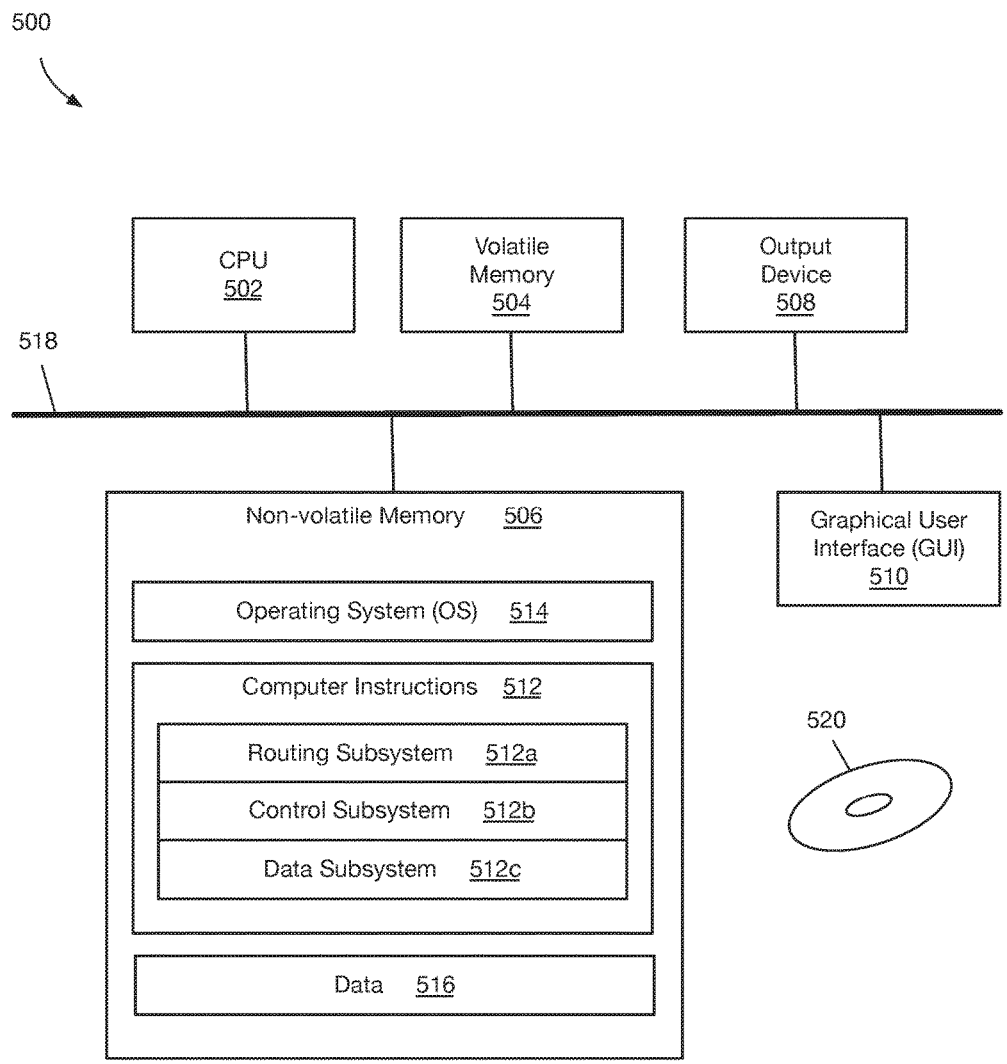
FIG. 5 is a schematic representation of an illustrative computer, in accordance with an embodiment of the disclosure.

FIG. 5 shows an illustrative computer (e.g., physical or virtual) or other processing device 500 that can perform at least part of the processing described herein. In some embodiments, the computer 500 forms a part of a storage system, such as storage system 100 of FIG. 1. The computer 500 may include a processor 502, a volatile memory 504, a non-volatile memory 506 (e.g., hard disk or SSD), an output device 508 and a graphical user interface (GUI) 510 (e.g., a mouse, a keyboard, a display, for example), each of which is coupled together by a bus 518. The non-volatile memory 506 is configured to store computer instructions 512, an operating system 514, and data 516. In one embodiment, the computer instructions 512 are executed by the processor 502 out of volatile memory 504. In some embodiments, an article 520 comprises non-transitory computer-readable instructions.

In the embodiment shown, computer instructions 512 may include routing subsystem instructions 512a that may correspond to an implementation of a routing subsystem 102a (FIG. 1), control subsystem instructions 512b that may correspond to an implementation of a control subsystem 102b, and data subsystem instructions 512c that may correspond to an implementation of a data subsystem 102c.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method comprising:
   visiting each node of a snapshot tree within a content-based storage system having a plurality of volumes and snapshots;
   for each node, scanning an address-to-hash (A2H) table to calculate one or more resource usage metrics, wherein the A2H tables map logical I/O addresses to chunk hashes;
   determining, based on the resource usage metrics, an amount of one or more of memory and disk capacity that would be freed by deleting one or more of the volumes and snapshots, the determining performed on a per-node basis and including determining the amount of memory for each ancestor node of the node that is not also an ancestor node of another node, determining the amount of memory for each leaf node of the node, and summing the resource usage metrics for each of the ancestor nodes of the node and for each of the leaf nodes of the node; and
   deleting the one or more of the volumes and snapshots from the content-based storage system determined based on the per-node resource usage metrics.

2. The method of claim 1 wherein, for each node, scanning the A2H table to calculate one or more resource usage metrics includes determining a count of entries in the A2H table.

3. The method of claim 2 wherein determining an amount of one or more of memory and disk capacity that would be freed by deleting one or more of the volumes and snapshots includes determining, for each node, an amount of memory based on the count of entries in the A2H table.

4. The method of claim 2 further comprising determining accessible space provided by one or more of the volumes and snapshots.

5. The method of claim 1 wherein, for each node, scanning the A2H table to calculate one or more resource usage metrics includes:
   finding one or more unique chunks associated with the node; and
   determining a compression ratio for each of the unique chunks associated with the node.

6. The method of claim 5 wherein determining an amount of one or more of memory and disk capacity that would be freed by deleting one or more of the volumes and snapshots includes determining, for each node, a minimum disk capacity that would be freed by deleting the node using a count of unique chunks and the compression ratios.

7. The method of claim 1 wherein, for each node, scanning the A2H table to calculate one or more resource usage metrics includes:
   determining a count of chunks associated with the node;
   determining a compression ratio for each of the chunks associated with the node; and
   determining a reference count for each of the chunks associated with the node.

8. The method of claim 7 wherein determining an amount of one or more of memory and disk capacity that would be freed by deleting one or more of the volumes and snapshots includes determining, for each node, an estimated disk capacity that would be freed by deleting the node based on the count of chunks associated with the node, the compression ratios, and the reference counts.

9. A computer program product tangibly embodied in a non-transitory computer-readable medium, the computer-readable medium storing program instructions that are executable to:
   visit each node of a snapshot tree within a content-based storage system having a plurality of volumes and snapshots;
   for each node, scan an address-to-hash (A2H) table to calculate one or more resource usage metrics, wherein the A2H tables map logical I/O addresses to chunk hashes;
   determine, based on the resource usage metrics, an amount of one or more of memory and disk capacity that would be freed by deleting one or more of the volumes and snapshots, the determining performed on a per-node basis and including determining the amount of memory for each ancestor node of the node that is not also an ancestor node of another node, determining the amount of memory for each leaf node of the node, and summing the resource usage metrics for each of the ancestor nodes of the node and for each of the leaf nodes of the node; and
   delete the one or more of the volumes and snapshots from the content-based storage system determined based on the per-node resource usage metrics.

10. The computer product of claim 9 wherein, for each node, scanning the A2H table to calculate one or more resource usage metrics includes determining a count of entries in the A2H table.

11. The computer product of claim 10 wherein determining an one or more of amount of memory and disk capacity that would be freed by deleting one or more of the volumes and snapshots includes determining, for each node, an amount of memory based on the count of entries in the A2H table.

12. The computer product of claim 10 further comprising determining accessible space provided by one or more of the volumes and snapshots.

13. A system comprising:
   a processor;
   a volatile memory; and
   a non-volatile memory storing computer program code that when executed on the processor causes the processor to execute a process operable to:
      visit each node of a snapshot tree within a content-based storage system having a plurality of volumes and snapshots;
      for each node, scan an address-to-hash (A2H) table to calculate one or more resource usage metrics, wherein the A2H tables map logical I/O addresses to chunk hashes;
      determine, based on the resource usage metrics, an amount of one or more of memory and disk capacity that would be freed by deleting one or more of the volumes and snapshots, the determining performed on a per-node basis and including determining the amount of memory for each ancestor node of the node that is not also an ancestor node of another node, determining the amount of memory for each leaf node of the node, and summing the resource usage metrics for each of the ancestor nodes of the node and for each of the leaf nodes of the node; and delete the one or more of the volumes and snapshots from the content-based storage system determined based on the per-node resource usage metrics.

14. The system of claim 13 wherein, for each node, scanning the A2H table to calculate one or more resource usage metrics includes determining a count of entries in the A2H table.

15. The system of claim 14 wherein determining an amount of one or more of memory and disk capacity that would be freed by deleting one or more of the volumes and snapshots includes determining, for each node, an amount of memory based on the count of entries in the A2H table.

16. The system of claim 14 further comprising determining accessible space provided by one or more of the volumes and snapshots.

17. The system of claim 13 wherein, for each node, scanning the A2H table to calculate one or more resource usage metrics includes:

finding one or more unique chunks associated with the node; and determining a compression ratio for each of the unique chunks associated with the node.

18. The system of claim 17 wherein determining an amount of one or more of memory and disk capacity that would be freed by deleting one or more of the volumes and snapshots includes determining, for each node, a minimum disk capacity that would be freed by deleting the node using a count of unique chunks and the compression ratios.

19. The system of claim 13 wherein, for each node, scanning the A2H table to calculate one or more resource usage metrics includes:

determining a count of chunks associated with the node;

determining a compression ratio for each of the chunks associated with the node; and determining a reference count for each of the chunks associated with the node.

20. The system of claim 19 wherein determining an amount of one or more of memory and disk capacity that would be freed by deleting one or more of the volumes and snapshots includes determining, for each node, an estimated disk capacity that would be freed by deleting the node based on the count of chunks associated with the node, the compression ratios, and the reference counts.

* * * * *